(12) United States Patent
Nakagawa

(10) Patent No.: US 7,560,268 B2
(45) Date of Patent: Jul. 14, 2009

(54) PROCESS FOR MANUFACTURING BIOCHIP, PROBE SOLUTION, AND BIOCHIP

(75) Inventor: Tohru Nakagawa, Shiga (JP)

(73) Assignee: Panasonic Corporation, Osaka (JP)

( * ) Notice: Subject to any disclaimer, the term of this patent is extended or adjusted under 35 U.S.C. 154(b) by 321 days.

(21) Appl. No.: 10/585,720

(22) PCT Filed: Mar. 16, 2005

(86) PCT No.: PCT/JP2005/004626

§ 371 (c)(1), (2), (4) Date: Jul. 11, 2006

(87) PCT Pub. No.: WO2005/095961

PCT Pub. Date: Oct. 13, 2005

(65) Prior Publication Data

US 2007/0148654 A1    Jun. 28, 2007

(30) Foreign Application Priority Data

Mar. 17, 2004   (JP)   ............................. 2004-077002

(51) Int. Cl.
*C12Q 1/68* (2006.01)
*C12M 1/36* (2006.01)
*G01N 15/06* (2006.01)
*C07H 21/04* (2006.01)

(52) U.S. Cl. .................. 435/283.1; 435/6; 435/7.1; 435/287.2; 422/68.1; 536/23.1

(58) Field of Classification Search .................. None
See application file for complete search history.

(56) References Cited

U.S. PATENT DOCUMENTS 5,342,772 A * 8/1994 Arenzen et al. ............. 435/181
5,405,783 A   4/1995 Pirrung et al.

(Continued)

FOREIGN PATENT DOCUMENTS

JP    2003-28864   1/2003

(Continued)

OTHER PUBLICATIONS

Kaelble, D.H., "Dispersion-Polar Surface Tension Properties of Organic Solids", J. Adhesion, vol. 2, Apr. 1970, p. 66-81.

*Primary Examiner*—BJ Forman
(74) *Attorney, Agent, or Firm*—Hamre, Schumann, Mueller & Larson, P.C.

(57) ABSTRACT

The present invention provides a process for manufacturing a biochip having high density probe regions and being resistant to contamination caused by organic materials or the like. For achieving the object, the process for manufacturing a biochip of the present invention includes a step of adhering a probe solution to a substrate so as to fix a probe onto the substrate, where the probe solution 1 contains probes and molecules having hydrophobic chains and functional groups to be adsorbed onto the substrate. When the probe solution 1 adheres to the substrate 2, a monomolecular film 3 of the molecules adsorbed onto the substrate via the functional groups is formed on the substrate, and the monomolecular film 3 suppresses spreading and bleeding of the probe solution 1 so as to provide a probe solution 4. The hydrophobic chains are fluoroalkyl chains preferably.

3 Claims, 7 Drawing Sheets

U.S. PATENT DOCUMENTS

| | | | |
|---|---|---|---|
| 5,412,087 A | * 5/1995 | McGall et al. | 536/24.3 |
| 5,550,184 A | 8/1996 | Halling | |
| 6,048,695 A | * 4/2000 | Bradley et al. | 435/6 |
| 6,258,454 B1 | 7/2001 | Lefkowitz et al. | |
| 6,476,215 B1 | 11/2002 | Okamoto et al. | |
| 6,979,728 B2 | * 12/2005 | Bradley et al. | 536/23.1 |

FOREIGN PATENT DOCUMENTS

| | | |
|---|---|---|
| JP | 2003-329685 | 11/2003 |
| JP | 2004-20280 | 1/2004 |

* cited by examiner

PROCESS FOR MANUFACTURING BIOCHIP, PROBE SOLUTION, AND BIOCHIP

TECHNICAL FIELD

The present invention relates to a process for manufacturing a biochip, a probe solution and a biochip.

BACKGROUND ART

A biochip enables the following steps to be carried out simultaneously in a large amount: fixing on a support (substrate) bio molecules such as DNA, protein, sugar chains or the like, or cells; contacting the thus fixed bio molecules, cells or the like (hereinafter referred to as 'probes') with bio molecules or any other compounds (hereinafter referred to as 'targets'); and detecting the thus resulting characteristic interactions. Among such biochips, a DNA chip is prepared by fixing several thousands or several tens of thousands kinds of DNA fragments and synthetic oligonucleotide (hereinafter, they will be referred to as 'DNA probes') respectively at predetermined positions on a glass substrate, a silicon substrate or the like that is square, several centimeters on the side. Such a DNA chip is used, for example, for measuring simultaneously a number of genes being expressed. It can be used also in genetic screening for detecting the presence of a particular gene, for example.

The genetic screening using a DNA chip can be performed in the following steps, for example.
1. Messenger RNA (mRNA) is extracted from cells or blood of a specimen.
2. Complementary DNA (cDNA) is reverse-transcribed and replicated from the mRNA, fragmented and bonded to fluorochrome for labeling, thereby preparing a target.
3. The thus labeled cDNA (target) is contacted with the DNA chip so as to bond to the DNA probe on the substrate. The cDNA as the target is bonded to DNA probe complementary to the cDNA.
4. The DNA chip is washed in order to remove the target not being bonded to the DNA probe.
5. Color development of the fluorochrome is observed with a fluorescence microscope so as to detect the position and amount of the targets on the DNA chip substrate.

Processes for manufacturing a DNA chip is classified roughly into two types. The first type utilizes a photolithography method that is used in the semiconductor manufacturing technique. According to this process, four kinds of mononucleotides as constituent units of DNA are bonded chemically in a predetermined order respectively at predetermined positions on the substrate so as to form oligonucleotide (see Patent Document 1, for example). As used herein, a word "oligonucleotide" denotes a polymer of several or several tens of nucleotides, and it is formed for example by fragmenting a polynucleotide with a high polymerization degree (such as a natural nucleic acid), or its molecular weight is smaller than that of the polynucleotide.

The second type is a process for manufacturing a DNA chip, where oligonucleotide to be fixed is dissolved in a liquid previously, and the liquid is micro-dripped on predetermined positions of a substrate and fixed thereto. Methods for fixing the oligonucleotide onto the substrate include, for example, a process using chemical bonding, a process using physical adsorption and the like, and an ink jet method can be applied to the micro-dripping (see Patent Document 2, for example). In the ink jet method, droplets are discharged from a number of holes toward a substrate, where each of the holes formed on a nozzle plate has a diameter of several tens of micrometers, thereby placing the liquid on predetermined positions of the substrate. This method is used commonly as an ink jet printing method.

According to a process for manufacturing a DNA chip by an ink jet method, a DNA chip can be manufactured easily at a low cost in comparison with the first method. Therefore, the ink jet method is expected to contribute to the process for manufacturing DNA chips in the future. However, the process can cause problems from the following viewpoints:

(1) accuracy in placing droplets on predetermined positions of a substrate; and
(2) spreading and bleeding of a solution discharged on a substrate by the ink jet method.

The accuracy in placement as raised in (1) above is an essential factor for the quality of the DNA chip, and the accuracy can be improved by developing an ink jet discharger that allows highly-accurate printing. Some commercially-available ink jet printers can place droplets having a diameter of several tens of micrometers on a substrate with a positional accuracy of ±30 µm. Reduction in size and the positional accuracy of the droplets are considered to improve remarkably by future remodeling of the apparatuses.

Spreading and bleeding of a solution on a substrate as mentioned in (2) above will restrict the density in placing the DNA probe regions on the substrate. Namely, for raising the density of the DNA probe regions, the respective DNA probe solutions must be placed on the substrate at a narrow spacing. The solutions will overlap each other due to spreading or bleeding of the solutions. When the spacing between the respective solutions is widened for avoiding the overlapping of the solutions, the probe density will decrease.

FIGS. 5A-5F show schematically that a DNA probe solution discharged by an ink jet method is spreading on a substrate. The same reference numerals in FIGS. 5A-5F are assigned to the same elements. FIG. 5A-5C show a case where a DNA probe solution discharged toward the substrate by an ink jet method does not spread on the substrate. Specifically, FIG. 5A shows that a DNA probe solution 51 is discharged by an ink jet method toward a substrate 53 in a direction indicated by an arrow 52. FIG. 5B shows a DNA probe solution 54 on the substrate 53, which was observed just after contacting the DNA probe solution 54 with the substrate 53. FIG. 5C shows a DNA probe solution 55 on the substrate 53, which was observed after a lapse of time from the contact. As shown in FIGS. 5A-5C, substantially there is no difference between a contact area of the solution 54 observed just after contacting the solution 54 with the substrate 53 (FIG. 5B) and a contact area of the solution 55 on the substrate 53 over time (FIG. 5C), and this indicates that the DNA probe solution will not spread on the substrate 53. In contrast, FIGS. 5D-5F show schematically a case where a DNA probe solution spreads on a substrate. Specifically, FIG. 5D shows that the DNA probe solution 51 is discharged by an ink jet method toward the substrate 53 in a direction indicated by the arrow 52. FIG. 5E shows a DNA probe solution 56 on the substrate 53, which was observed just after contacting the DNA probe solution 54 with the substrate 53. FIG. 5F shows a DNA probe solution 57 on the substrate 53 after a lapse of time from the contact. As shown in FIGS. 5D-5F, the contact area of the solution 56 just after contacting the solution 56 with the substrate 53 (FIG. 5E) increases over time. Namely, the solution 57 spreads on the substrate 53 (FIG. 5F).

FIGS. 6A-6C are plan schematic views showing a DNA chip substrate before fixing DNA probe solutions and after discharging the DNA probe solutions by an ink jet method. The same reference numerals in FIGS. 6A-6C are assigned to the same elements. FIG. 6A shows a DNA chip substrate 61 before fixing DNA probe solutions onto fixation regions 62. FIG. 6B shows the DNA chip substrate 61 for a case where DNA probe solutions 63 are discharged but not spreading on the substrate 61. FIG. 6C shows a DNA chip substrate 61 for a case where DNA probe solutions 64 are discharged to spread on the substrate 61. When the DNA probe solutions do not spread on the substrate, the solutions 63 are placed on predetermined regions 62 as shown in FIG. 6B. When the DNA probe solutions spread, the solutions 64 at adjacent regions will be mixed with each other as shown in FIG. 6C. For preventing the overlapping of the DNA probe solutions, spacing between the respective solutions (spacing between the DNA probe regions) must be increased. However, this will lower the density of the DNA probe regions on the substrate, and the number of spots of the DNA probe solutions allowed to be placed on a DNA chip will be restricted.

The tendency of spreading and bleeding of the DNA probe solutions provided by the ink jet method on a substrate often is effected from the method of fixing the DNA probes to the substrate. As mentioned above, examples of the method for fixing the DNA probes onto a substrate include chemical bonding and physical adsorption, and both the chemical bonding and physical adsorption use polar groups in DNA probes. Therefore, either polar groups to react chemically with the polar groups of the DNA probes or polar groups to form ionic bonds or hydrogen bonds with the polar groups of the DNA probes will exist on the substrate to fix the DNA probes. A substrate surface having polar groups has a high surface energy and favorable wettability with respect to liquids. Therefore, a DNA chip substrate generally has a high surface energy and thus the DNA probe solution discharged by an ink jet method easily will spread or bleed on the substrate.

In a method disclosed for solving the problems of spreading and bleeding of the DNA probe solution on a substrate, regions for fixing the DNA probes are made to be hydrophilic with the surrounding regions being hydrophobic in order to prevent the DNA probe solution from spreading from the fixing regions (see Patent Document: D3). Accordingly, DNA chips can be manufactured in this method by: preparing a substrate whose surface is water-repellent in an untreated condition and becomes hydrophilic by a treatment with light beams or heat; forming a pattern of water-repelling regions and hydrophilic regions on the substrate surface by irradiating with light through a metal mask for example; and then discharging solutions containing DNA probes on the hydrophilic regions by an ink jet method.

Patent Document D1: U.S. Pat. No. 5,405,783
Patent Document D2: JP 2001-66305 A
Patent Document D3: JP 2003-28864 A

DISCLOSURE OF INVENTION

Problem to be Solved by the Invention

The above-mentioned process is advantageous in that DNA probe regions can be placed at a high density since the DNA solutions will not spread on the substrate. In the method however, forming patterns on the substrate will require more time and effort. Furthermore, for discharging and spotting precisely the DNA probe solutions exclusively on the hydrophilic regions of the pattern-formed substrate, a means for detecting the hydrophilic regions must be provided for the ink jet device, or the substrate must be disposed precisely in the ink jet device. As a result, the production cost will be raised and/or the number of the production steps will be increased.

Another problem for biochips such as the DNA chips is that when the surface of the biochip is contaminated due to adhesion of organic materials or the like, bonding between a target as a specimen and a probe fixed onto the substrate will be inhibited, resulting in degradation in detectability in the genetic screening using biochips. As a result, the biochips must be stored carefully to avoid such problems, and thus the operability deteriorates.

Therefore, with the foregoing in mind, it is an object of the present invention to provide a process for manufacturing a biochip, and according to the process, when fixing probes on a substrate by using a probe solution, spreading and bleeding of the probe solution on the substrate can be suppressed easily. Thereby probe regions can be arranged at a high density and the thus manufactured biochip is resistant to contamination caused by organic materials or the like.

Means for Solving Problem

In order to achieve the above-mentioned object, a process for manufacturing a biochip according to the present invention includes a step of providing a probe solution, a step of providing a substrate, a step of placing the probe solution on the substrate, and a step of fixing probes in the thus placed probe solution onto the substrate; where the probe solution contains molecules having hydrophobic chains and functional groups to be adsorbed onto the substrate together with the probes.

Effects of the Invention

In manufacturing a biochip such as a DNA chip, a probe solution discharged on a substrate by an ink jet method can cause a problem of spreading and/or bleeding on the substrate. The inventors keenly have searched for a method of suppressing the spreading and bleeding of the solution in a simpler and easier manner. And in the studies, the inventors focuses attention on the surface energy of the substrate, since it is one factor causing the spreading and bleeding of the solution. As a result, the inventors found the following fact. That is, when molecules having hydrophobic chains and functional groups to be adsorbed onto a substrate are dissolved in the probe solution, the bleeding and spreading of the probe solution can be suppressed due to the following mechanism: when the probe solution is placed on the substrate, the molecules are adsorbed onto the substrate via the functional groups and form a monomolecular film, and the surface energy of the substrate is lowered due to the monomolecular film. Furthermore, the inventors found that when the monomolecular film is formed on regions to which the probes are fixed, the regions will be resistant to contamination caused by organic materials or the like, resulting in the present invention.

In a process according to the present invention, a biochip of the present invention can be manufactured, and the biochip has hydrophilic regions and hydrophobic regions. Specifically for example, regions to which probes are fixed are hydrophobic and regions other than the probe regions on the substrate surface are hydrophilic. With this biochip, for example, since a sample solution containing the target molecules can react with the probes on the biochip efficiently with high reproducibility, a measurement can be carried out more accurately.

In an ordinary process for interacting probes fixed on the biochip with target molecules, a solution in which the target molecules are dissolved is dripped onto the entire biochip, or the biochip is dipped in a sample solution. However, the following problems can occur for example, when the probes and the target sample solution are reacted with each other in the above-mentioned manner, using the conventional biochip having hydrophilic regions where the probes exist and the remaining water-repellent regions. That is, in a process of dripping the target sample solution on the biochip, when the normal line of the substrate surface of the biochip is inclined even slightly from the vertical direction (gravitational direction), the droplets will become spherical due to the water-repelling force of the biochip surface and most of the droplets will drop off from the biochip surface. In this case, the target molecules and the probes cannot interact with each other efficiently. Moreover, in a method of dipping the biochip in the target sample solution, air bubbles will adhere to the water-repellent regions with even a little carelessness. The air bubbles will cover the probe regions and inhibit the interaction between the target molecules and the probes. On the contrary, in the biochip of the present invention, regions to which the probes are not fixed can have hydrophilicity. Therefore, even when the normal line of the substrate surface is inclined, the target sample solution dripped on the substrate will not drop off easily from the biochip surface of the present invention. Moreover, in a case where the biochip of the present invention is dipped in a target sample solution, the water-repellent regions are restricted to the probe regions. As a result, substantially no air bubbles will adhere to the biochip surface, and thus the target molecules and the probes can interact with each other efficiently. For this reason, the target molecules and the probes of the biochip of the present invention interact with each other efficiently in comparison with the conventional technique, and thus the target molecules can be measured accurately.

Furthermore, the process for manufacturing a biochip of the present invention contributes easily to suppress spreading and bleeding of the probe solution on the substrate, and the process requires no additional steps of, for example, forming patterns of hydrophilic regions and hydrophobic regions on the substrate. Accordingly, a biochip having probe regions placed at a high density can be manufactured easily, and for example, an inexpensive biochip can be manufactured. Furthermore, according to the process of the present invention, a biochip resistant to contamination can be manufactured. Therefore, the biochip can be handled easily in storage and operations or the like, and for example, studies and diagnosis of genes using DNA chips or the like can be performed in a simpler and easier manner.

Figure 1A:
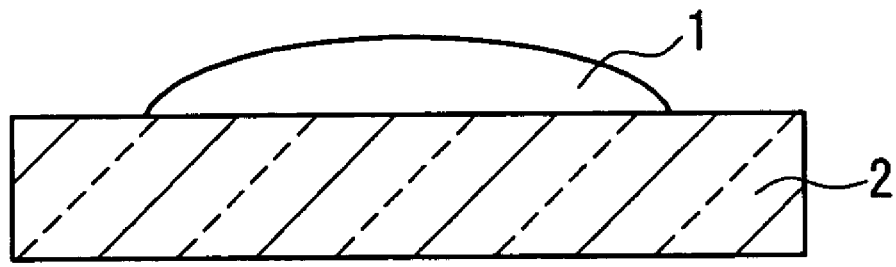
FIGS. 1A-1C are schematic views showing one example where a probe solution dripped on a substrate changes over time.

EXPLANATION OF LETTERS AND NUMERALS 1 a probe solution
2 a substrate
3 a substrate with a lowered surface energy
4 a probe solution repelled on a substrate surface and shrinking
20 a functional group adsorbed to a substrate
21 a probe solution
22 DNA probes
23 molecules having fluoroalkyl chains
24 a substrate
25 a monomolecular film of molecules having fluoroalkyl chains and being formed on a substrate
26 DNA probes fixed onto a substrate
27 a probe solution shrinking as a result of lowering of surface energy of a substrate
28 molecules having fluoroalkyl chains adsorbed onto a monomolecular film
29 DNA probes adsorbed onto a monomolecular film
30 a group having a fluoroalkyl chain
31 an entire ink jet printer
32 an ink jet head
33 a recording medium
34 a carriage shaft
35 a carriage
36 rollers
40 an alternate long and short dashed line
41 a piezoelectric element
42 a diaphragm
43 a pressure chamber
44 an ink-feeding hole
45 an ink flow channel
46 a nozzle hole
47 a piezoelectric element deformed by voltage application
48 a discharged ink
49 a flight direction of ink
51 a DNA probe solution discharged by an ink jet method
52 a vector indicating a discharge direction
53 a substrate
54 a DNA probe solution on a substrate, which is observed just after contacting the DNA probe solution with the substrate
55 a DNA probe solution not spreading
56 a DNA probe solution on a substrate, which is observed just after contacting the DNA probe solution with the substrate
57 a DNA probe solution after spreading
61 a DNA chip substrate
62 positions for fixing DNA probes (within circles of broken lines)
63 DNA probe solutions being placed ideally
64 DNA probe solutions spreading on a substrate and being contacted with adjacent probe solutions
71 a liquid
72 a substrate
73 a tangent of a liquid surface at a part where a liquid and a substrate are contacted with each other

74 a vector indicating an interfacial energy between a substrate and a liquid
75 a vector indicating a surface energy of a substrate
76 a vector indicating a surface tension of a liquid
77 a contact angle

DESCRITPION OF THE INVENTION

In the process for manufacturing a biochip of the present invention, an example of the above-mentioned hydrophobic chain of a molecule having the hydrophobic chain and a functional group to be adsorbed onto a substrate is a hydrocarbon chain. A preferable example of the hydrocarbon chain is a haloalkyl chain formed by substituting at least one hydrogen atom of a hydrocarbon chain with a halogen atom, and more preferably, a fluoroalkyl chain.

In the process for manufacturing a biochip of the present invention, a functional group of a molecule having a hydrophobic chain and the functional group to be adsorbed onto a substrate is, for example, OH, NH$_2$, SH, SS, COOH, SiOH, Si(OR) (R denotes a methyl group, an ethyl group, a propyl group or a butyl group) and Si[(O—CH$_2$CH$_2$)$_m$—OR] (m is a natural number in a range of 1 to 10, and R denotes a methyl group, an ethyl group, a propyl group or a butyl group), preferably.

In the process for manufacturing a biochip of the present invention, preferably, the molecule having the fluoroalkyl chain and the functional group is a compound represented by the Formula (1) or (2) below, or a hydrolysate thereof.

  (1)

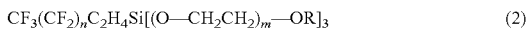  (2)

In the above Formula (1), R and Y denote a methyl group, an ethyl group, a propyl group or a butyl group independently; n is a natural number in a range of 1 to 10, and x is a natural number in a range of 1 to 3. When x=1, two Rs exist, and the Rs can be different from each other. In the above Formula (2), R denotes a methyl group, an ethyl group, a propyl group or a butyl group; n is a natural number in a range of 1 to 10; and m is a natural number in a range of 1 to 10.

In the process for manufacturing a biochip of the present invention, it is preferable that the probe solution is placed on the substrate by dripping or by discharging in an ink jet method.

It is preferable that the process for manufacturing a biochip of the present invention further includes a step of washing the substrate with a liquid after fixing the probe onto the substrate.

In the process for manufacturing a biochip of the present invention, it is preferable that the probe is derived from at least one selected from the group consisting of a nucleic acid, a protein, a sugar, a cell, and a modified substance thereof.

The probe solution of the present invention is a probe solution for a biochip, and it contains molecules having hydrophobic chains and polar groups together with probes. The probe solution of the present invention can be used for manufacturing the biochip of the present invention.

In the probe solution of the present invention, an example of the above-mentioned hydrophobic chain of the molecule having the hydrophobic chain and a polar group is a hydrocarbon chain, preferably, a haloalkyl chain formed by substituting at least one hydrogen atom of a hydrocarbon chain with a halogen atom, and more preferably, a fluoroalkyl chain.

In the probe solution of the present invention, the polar group of the molecule having the hydrophobic chain and a polar group is, for example, OH, NH$_2$, SH, SS, COOH, SiOH, Si(OR) (R denotes a methyl group, an ethyl group, a propyl group or a butyl group) and Si[(O—CH$_2$CH$_2$)$_m$—OR] (m is a natural number in a range of 1 to 10, and R denotes a methyl group, an ethyl group, a propyl group or a butyl group), preferably.

In the probe solution of the present invention, preferably, the molecule having a fluoroalkyl chain and a polar group is a compound represented by the Formula (1) or (2) below, or a hydrolysate thereof.

  (1)

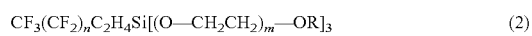  (2)

In the above Formula (1), R and Y denote a methyl group, an ethyl group, a propyl group or a butyl group independently; n is a natural number in a range of 1 to 10, x is a natural number in a range of 1 to 3. When x=1, two Rs exist, and the Rs can be different from each other. In the above Formula (2), R denotes a methyl group, an ethyl group, a propyl group or a butyl group; n is a natural number in a range of 1 to 10; and m is a natural number in a range of 1 to 10.

In the probe solution of the present invention, it is preferable that the probe is derived from at least one selected from the group consisting of a nucleic acid, a protein, a sugar, a cell, and a modified substance thereof.

A biochip of the present invention is a biochip manufactured by a process for manufacturing a biochip according to the present invention, or a biochip manufactured by using a probe solution of the present invention. Preferably, the biochip has the monomolecular film of the molecules adsorbed onto the substrate via the functional groups, which is formed on the regions to which the probes are fixed.

A biochip as an alternative of the present invention includes a substrate, a monomolecular film including molecules having functional groups to be adsorbed onto the substrate and hydrophobic chains and being formed on a plurality of regions disposed separately from each other on the substrate, and probes fixed onto the substrate in the regions in which the monomolecular film is formed. An example of the hydrophobic chain of the molecule is a hydrocarbon chain, and preferably a haloalkyl chain formed by substituting at least one hydrogen atom of a hydrocarbon chain to a halogen atom, and more preferably, a fluoroalkyl chain. For the probe, for example, a nucleic acid, a protein, a sugar, a cell, and a modified substance thereof can be used. It is preferable in the biochip of the present invention that the substrate surface is water-repellent in the probe regions and hydrophilic in regions other than the probe regions.

Figure 1B:
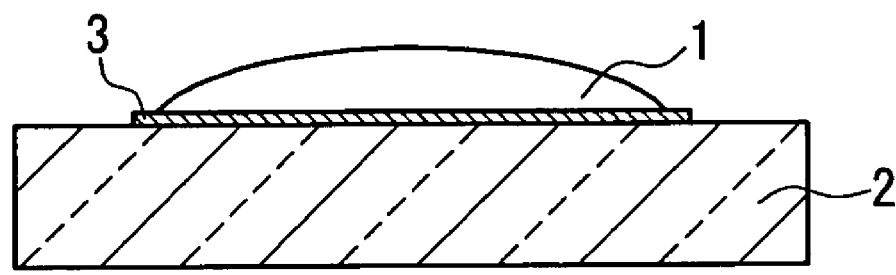
Figure 1C:
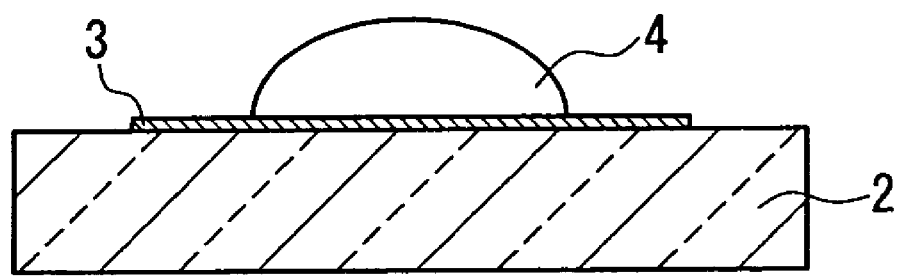

The following description with reference to FIGS. 1A-1C explains a mechanism of suppressing spreading and bleeding of a probe solution that has been placed on a substrate according to the process for manufacturing a biochip of the present invention. FIGS. 1A-1C are schematic views showing one example of a probe solution dripped on a substrate changes over time, and the same reference numerals in FIGS. 1A-1C are assigned to the same elements. FIG. 1A shows a probe solution 1 immediately after being dripped on a substrate 2. FIG. 1B shows that the surface energy of a surface 3 where the probe solution 1 and the substrate 2 are in contact with each other is lowered. FIG. 1C shows a probe solution 4 shrinking due to the surface 3 with a lowered surface energy.

The probe solution 1 is prepared by dissolving probes and molecules having hydrophobic chains and functional groups to be adsorbed onto the substrate, and the probe solution 1 is put in contact with the substrate 2 as shown in FIG. 1A. Then, as shown in FIG. 1B, the molecules having the hydrophobic chains and the functional groups to be adsorbed onto the substrate are adsorbed onto the substrate surface 3 where the solution 1 and the substrate 2 are in contact with each other, and thereby the surface energy of the substrate surface 3 is lowered. Therefore, as shown in FIG. 1C, the probe solution 4 is repelled on the surface of the substrate 2 and shrinks. As a result, the probe solution 4 having been dripped on the substrate 2 is placed accurately at a predetermined position on the substrate 2 without any substantial spreading or bleeding on the substrate.

Figure 2A:
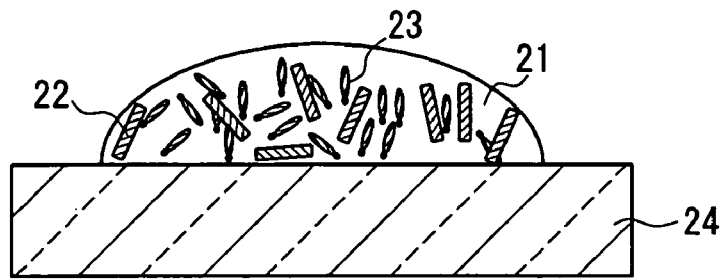
FIGS. 2A-2F are schematic views showing one example where a probe solution dripped on a substrate changes over time in a molecular level.
Figure 2B:
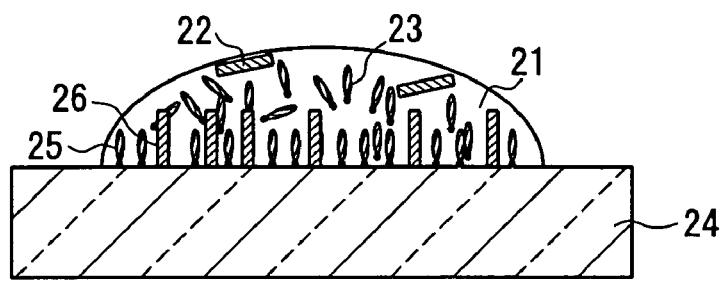
Figure 2C:
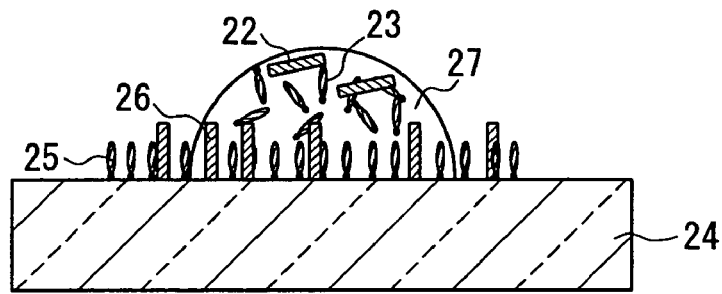
Figure 2D:
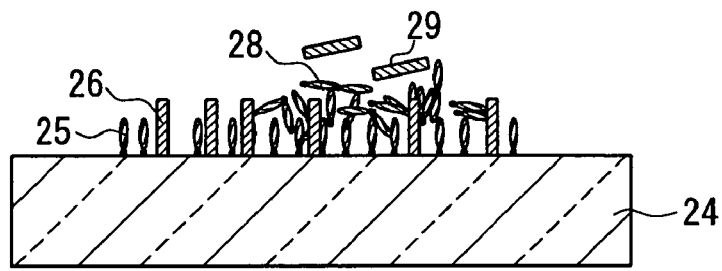
Figure 2E:
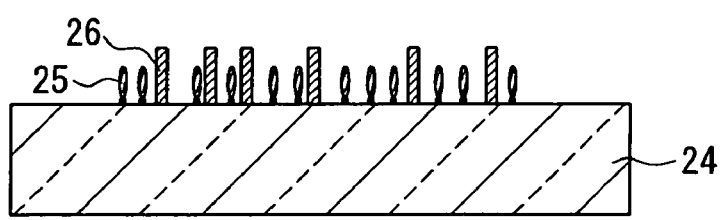

Behaviors of the probe solution on the substrate will be explained further at the molecular level by referring to FIGS. 2A-2F. FIGS. 2A-2F are schematic views showing, at the molecular level, one example where DNA probes are used. That is, a probe solution dripped on a substrate changes over time. In FIGS. 2A to 2F, the same reference numerals are assigned to the same elements. FIG. 2A shows a probe solution 21 containing DNA probes 22 and molecules 23 having hydrophobic chains and functional groups to be adsorbed onto a substrate. Specifically, the probe solution 21 in FIG. 2A is in a state immediately after being dripped on a substrate 24. FIG. 2B shows a part where the probe solution 21 and the substrate 24 are in contact with each other. In the part, a monomolecular film 25 of molecules 23 having hydrophobic chains and functional groups to be adsorbed onto the substrate is formed, and the DNA probes 22 are fixed onto the substrate so as to form DNA probes 26. FIG. 2C shows a probe solution 27 that shrinks on the substrate 24 whose surface energy has been lowered. FIG. 2D shows: the monomolecular film 25 on the substrate 24 after evaporation of the solvent of the probe solution; the DNA probes 26 fixed onto the substrate; molecules 28 having hydrophobic chains adsorbed onto the monomolecular film 25 and functional groups adsorbed onto the substrate; and DNA probes 29. FIG. 2E shows the substrate 24, which is obtained by washing the substrate shown in FIG. 2D.

Figure 2F:
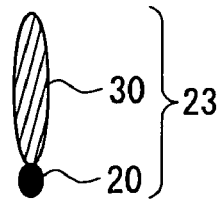

When the probe solution 21 is dripped on the substrate 24 as shown in FIG. 2A, the molecules 23 having hydrophobic chains and functional groups to be adsorbed onto a substrate are adsorbed onto the substrate 24 and form a monomolecular film 25, and the DNA probes 22 are fixed to the substrate 24 so as to form DNA probes 26 as shown in FIG. 2B. As shown in FIG. 2F, each molecule 23 having a hydrophobic chain and a functional group to be adsorbed onto a substrate contains a group 30 including a hydrophobic chain having a difficulty in chemically reacting with an organic molecule, and a functional group 20 to be adsorbed onto a substrate. The molecule 23 is adsorbed onto the substrate 24 via the functional group 20. The DNA probes 22 are fixed to the substrate 24 by the below-mentioned chemical bonding or physical bonding, depending on the types of the substrate 24 and the DNA probes 22 in use. In any cases, one end of each DNA probe 22 is fixed to the substrate 24 while the other end is movable. The surface energy of the substrate 24 is lowered due to the monomolecular film 25, and thus the probe solution 27 is repelled by the substrate 24 and shrinks as shown in FIG. 2C. Later, in a case where the solvent of the probe solution 27 is evaporated as shown in FIG. 2D, when concentrations of the molecules 23 and the DNA probes 22 in the probe solution exceed concentrations necessary for formation of a monomolecular film, molecules residing in the probe solution 27, namely, molecules 28 and DNA probes 29 adsorbed onto the monomolecular film 25, accumulate on the monomolecular film 25. These molecules can be removed by washing as shown in FIG. 2E.

Figure 7:
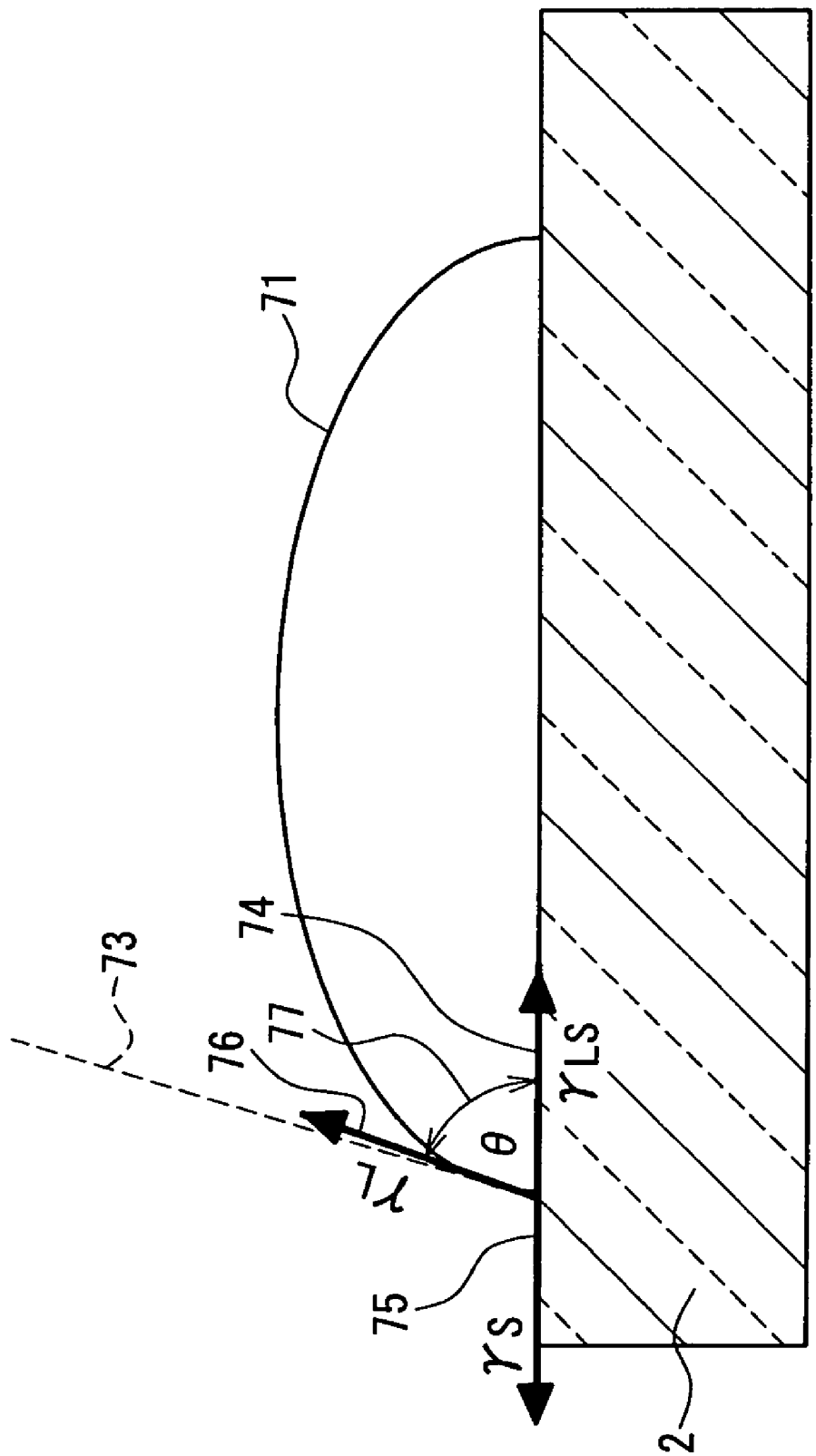
FIG. 7 is a schematic view showing a contact angle θ of a solution dripped on a substrate and a Young's relation.

As shown in FIGS. 1 and 2, a probe solution dripped on a substrate surface shrinks over time since the surface energy of the substrate is lowered. The factor of the probe solution shrinking can be explained with reference to Young's rule. As shown in FIG. 7, in general, the shape of a liquid 71 on a substrate 72 can be defined with a contact angle 77 that is formed by a vector 74 indicating an interfacial energy between the liquid 71 and the substrate 72, and a vector 76 indicating a surface tension of the liquid 71 in a tangential direction 73 of the liquid surface at the part where the liquid 71 and the substrate 72 are in contact with each other. The following Equation (3) holds for the relationship with the vector 75 indicating the surface energy of the substrate 72.

$$\cos\theta = (\gamma_S - \gamma_{LS})/\gamma_L \quad (3)$$

In the above Equation (3), $\theta$ denotes an angle of the contact angle 77, $\gamma_S$ denotes a magnitude of the vector 75 indicating the surface energy of the substrate, $\gamma_{LS}$ denotes a magnitude of the vector 74 indicating the interfacial energy, and $\gamma_L$ denotes a magnitude of the vector 76 indicating the surface tension of the liquid 71.

Here, the interfacial energy $\gamma_{LS}$ decreases with the decrease of the surface energy $\gamma_S$, but the decrease amount of the $\gamma_{LS}$ is smaller than the decrease amount of the $\gamma_S$ (D. K. Kaelble, J. Adhesion, vol. 2, 1970, P66-81). Therefore, when the surface energy $\gamma S$ of the substrate decreases, the right side in the Equation (3) decreases, and thus the contact angle $\theta$ increases. That is, since the contact angle $\theta$ increases with the decrease of the surface energy of the substrate 72, the liquid 71 shrinks over time.

Next, a process for manufacturing a biochip of the present invention will be described. In the present invention, a biochip can be manufactured, for example, by a process including steps of preparing a probe solution, preparing a substrate, placing the probe solution on the substrate, and fixing probes in the probe solution placed on the substrate to the substrate. For one example of the process for manufacturing a biochip, a process for manufacturing a DNA chip by use of DNA probes will be described specifically below. It should be noted that the present invention is not limited to the example.

(Preparation of Probe Solution)

A probe solution used in a process for manufacturing a biochip according to the present invention is prepared in the following manner. A first explanation is about molecules that are contained in the probe solution and that have hydrophobic chains and functional groups to be adsorbed onto a substrate.

There is no particular limitation on a hydrophobic chain of a molecule having the hydrophobic chain and a functional group to be adsorbed onto a substrate, and an example is a hydrocarbon chain, preferably a haloalkyl chain formed by substituting at least one hydrogen atom in a hydrocarbon chain with a halogen atom, and more preferably, a fluoroalkyl chain. The fluoroalkyl chain is stable chemically, and it is chemically inactive with most organic molecules. In addition to that, the fluoroalkyl chain does not form either an ionic bond or a hydrogen bond with other organic molecules but it bonds with other organic molecules by only Van der Waals force, and thus the bonding force is weaker than the bonding force of any other organic molecules. Therefore, it is further difficult to adhere organic molecules onto the monomolecular film of molecules having the fluoroalkyl chains, and even when adhering to the monomolecular film, the organic molecules can be removed easily for example, by washing with water. Examples of the functional groups to be adsorbed onto the substrate include OH, $NH_2$, SH, SS, COOH, SiOH, Si(OR) (R denotes a methyl group, an ethyl group, a propyl group or a butyl group) and $Si[(O-CH_2CH_2)_m-OR]$ (m is a natural number in a range of 1 to 10, and R denotes a methyl group, an ethyl group, a propyl group or a butyl group). Preferable examples include Si(OR) (R denotes a methyl group, an ethyl group, a propyl group or a butyl group) and Si[(O—CH$_2$CH$_2$)$_m$—OR] (m is a natural number in a range of 1 to 10, and R denotes a methyl group, an ethyl group, a propyl group or a butyl group).

The molecule having a hydrophobic chain and a functional group to be adsorbed onto a substrate, according to the present invention, is preferably a compound represented by the Formula (1) or (2) below, or a hydrolysate thereof. Here, a hydrolysate denotes a compound represented by the Formula (1) or (2) below, where a part or all of either OY bonded to Si or (O—CH$_2$CH$_2$)$_m$—OR becomes OH.

  (1)

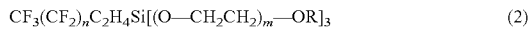  (2)

In the above Formula (1), R and Y denote a methyl group, an ethyl group, a propyl group or a butyl group independently; n is a natural number in a range of 1 to 10, and x is a natural number in a range of 1 to 3. When x=1, two Rs exist, and the Rs can be different from each other. In the above Formula (2), R denotes a methyl group, an ethyl group, a propyl group or a butyl group; n is a natural number in a range of 1 to 10; and m is a natural number in a range of 1 to 10.

A compound represented by the above Formula (1) or (2) or the hydrolysate reacts quickly with active hydrogen so as to form a siloxane bond (Si—O). Therefore, in a case where active hydrogen exist on the substrate surface, at the moment the probe solution and the substrate are contacted with each other, a monomolecular film of molecules having fluoroalkyl chains fixed with the siloxane bond is formed to lower the surface energy. This is preferable since the probe solution will be repelled well.

In the Formula (1), n is in a range of 4 to 10 preferably. When n is within the range, the molecule represented by the Formula (1) can form more easily a monomolecular film aligned on the substrate, and thus the surface energy of the substrate can be decreased more easily. In the Formula (1), it is preferable that x is large, and more preferably, x is 3. As x becomes large, reactivity between the molecules represented by the Formula (1) and the active hydrogen of the substrate is raised further, and thus the surface energy of the substrate will be lowered further. In the Formula (1), Y is a methyl group preferably, since the reactivity of molecules represented by the Formula (1) with active hydrogen will be raised further and the surface energy of the substrate will be lowered further.

The (O—CH$_2$CH$_2$)$_m$—OR group in Formula (2) is a polar group, and an advantage of such a group is that it can be dissolved easily in an aqueous solution. The molecule is particularly preferred as a molecule to be dissolved in a probe solution since probe solutions are aqueous in most cases.

The next explanation is about probes contained in a probe solution used in a process for manufacturing a biochip of the present invention. Such a probe is not limited particularly but it can be a probe derived of at least one selected from the group consisting of a nucleic acid, a protein, a sugar, a cell, and a modified substance thereof. For example, a biological DNA can be used. Alternatively, synthesized polynucleotide or oligonucleotide can be used. When fixation to a substrate is carried out by chemical bonding, a functional group can be bonded to one end of each probe as required. Examples of functional group that can be used for fixing to the substrate include NH$_2$, COOH, OH, PO$_3$H and SH. The bonding method is not limited particularly, and any conventionally known methods can be applied.

The probe solution used for a process for manufacturing a biochip of the present invention can be prepared by dissolving the above-mentioned probes and molecules having hydrophobic chains and functional groups to be adsorbed onto the substrate. In the probe solution, concentration of the molecules having the hydrophobic chains and the functional groups to be adsorbed onto a substrate is in a range of 0.01 to 20 wt % for example, preferably 0.01 to 5 wt %, and more preferably, 0.01 to 1 wt %. When the concentration value is within the more preferable range, a monomolecular film having hydrophobic chains for repelling a probe solution without modifying or aggregating the probe molecules can be formed on a substrate.

The solvent for the probe solution can be selected from pure water, salt-containing aqueous solutions, mixed solutions of pure water and polar organic solvents; and mixed solutions of pure water, polar organic solvents and salts. Among them for example, alcohol is used preferably for the polar organic solvent. For the alcohol, ethanol is preferred for example. The pH range of the probe solution is not limited particularly as long as the probes are not modified. In general, the pH ranges from 5 to 10 preferably, and more preferably, from 6 to 8.

(Preparation of Substrate)

Next, a substrate for a biochip is prepared. There is no particular limitation on a substrate used in a process for manufacturing a biochip of the present invention. For example, the substrate has active hydrogen on its surface, so that molecules having hydrophobic chains and functional groups to be adsorbed onto a substrate can be fixed to the substrate via the functional groups. For the substrate, glass, plastics, metals, ceramics and the like can be used. The surface of the substrate can be flat and smooth, or it can be rough or porous. Furthermore, the substrate can be rigid or flexible. The active hydrogen present on the substrate surface is not limited particularly, but it is, for example, —OH, —NH$_2$, —COOH, —SO$_3$H, —CN and the like. When manufacturing a biochip with a high probe density, a flat and rigid glass sheet or a glass substrate on which a metal thin film is formed is preferable.

It is preferable that probes can be fixed onto the substrate by at least either chemical bonding or physical bonding. For this purpose, for example, it is preferable that the surface of the substrate is subjected to plasma processing, ultraviolet processing, ozone processing, surface modification with a mercaptan compound or a silane coupling agent having NH$_2$, COOH, OH or SH, or a processing as a combination thereof.

(Placement of Probe Solution on a Substrate)

Next, the thus prepared probe solution is placed on a substrate prepared in the above-mentioned method. This step can be carried out, for example, by dripping the probe solution, but preferably, the probe solution is discharged on the substrate by using a discharging apparatus in accordance with an ink jet method. The ink jet method is advantageous in reducing the amount of the probe solution to adhere and improving the positional accuracy.

Figure 3:
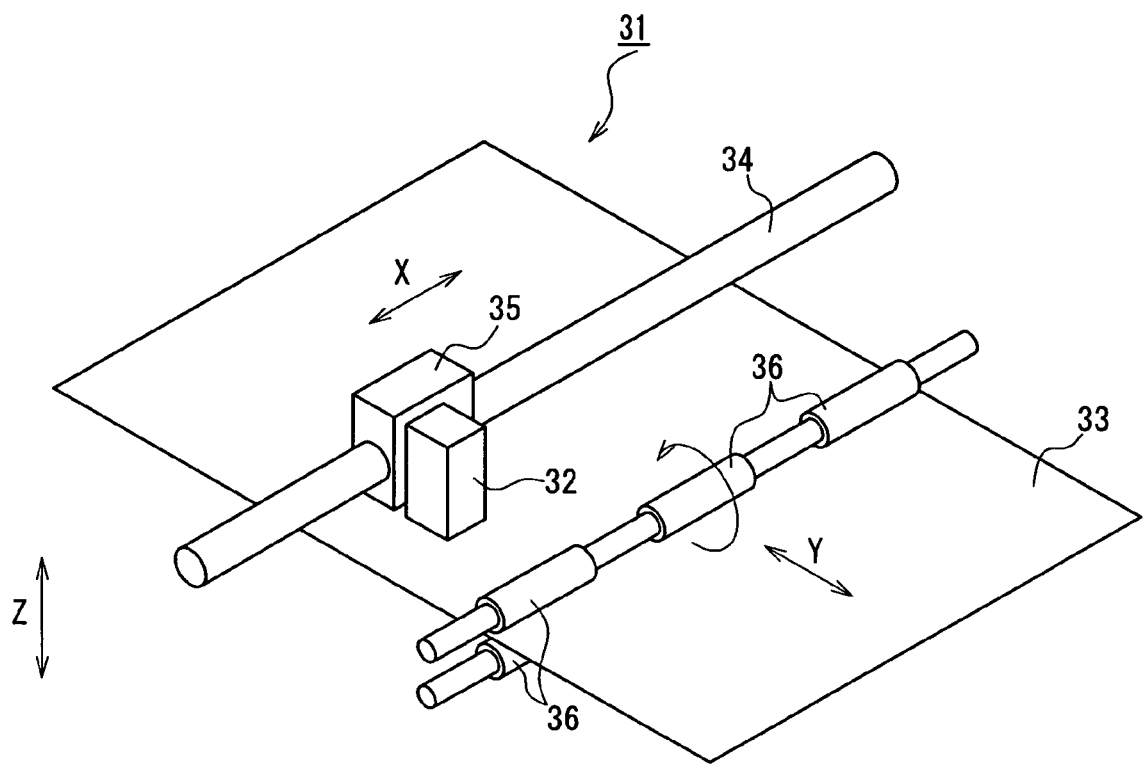
FIG. 3 is a schematic view showing one example of an ink jet printer.
Figure 4A:
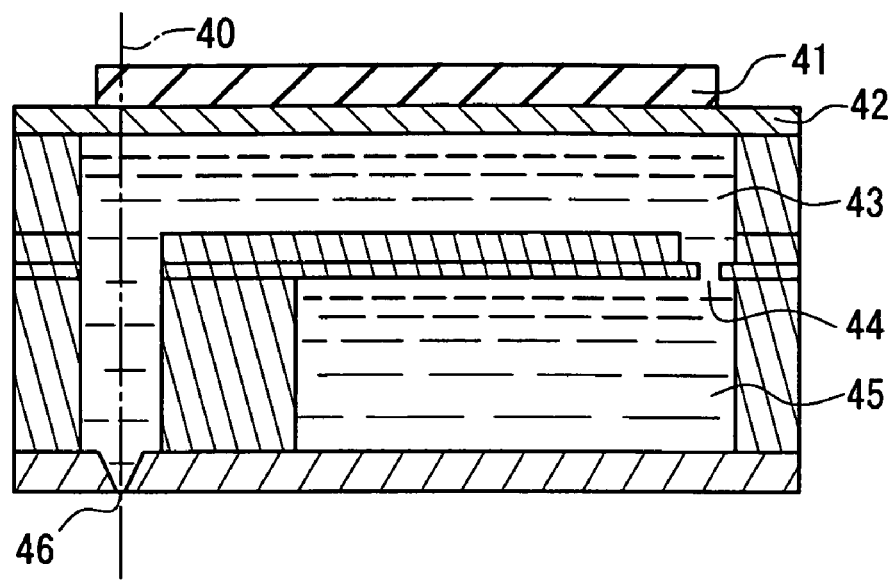
FIGS. 4A and 4B are schematic views showing one example of an ink jet head.
Figure 4B:
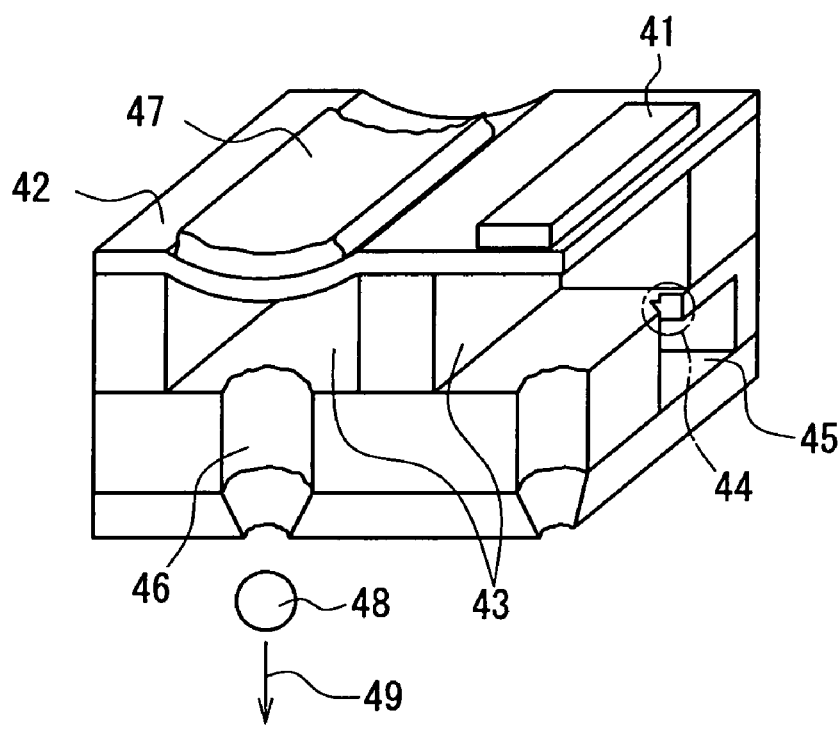
Figure 5A:
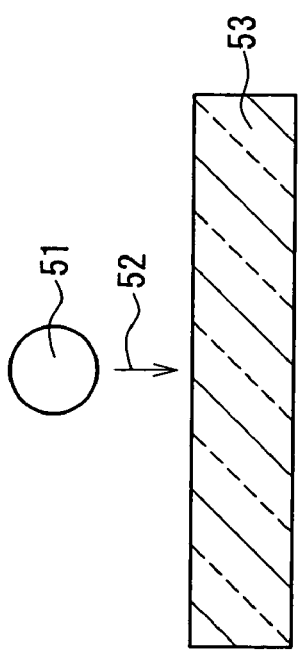
FIGS. 5A-5F are schematic views showing a spread of a solution discharged on a substrate.
Figure 5B:
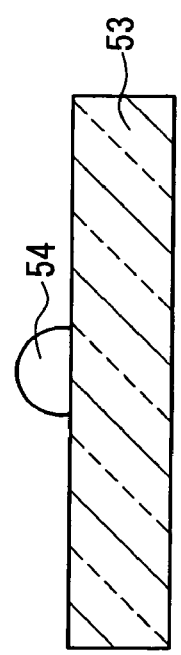
Figure 5C:
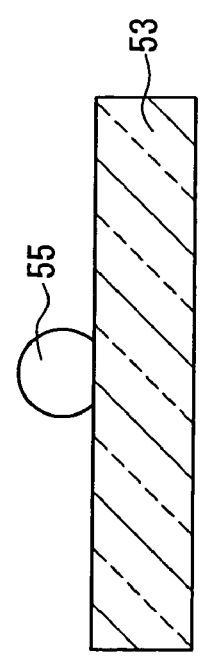
Figure 5D:
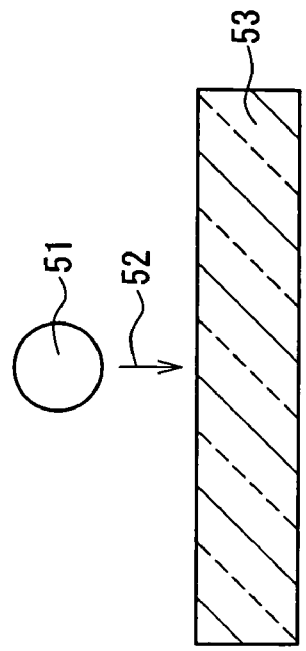
Figure 5E:
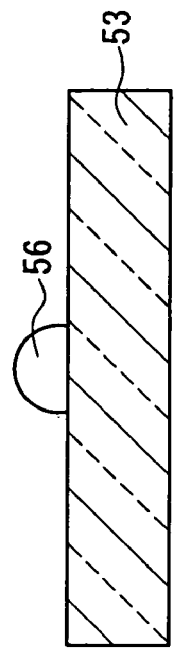
Figure 5F:
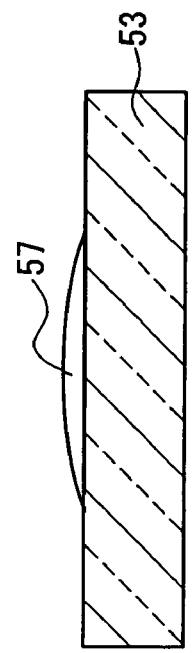
Figure 6A:
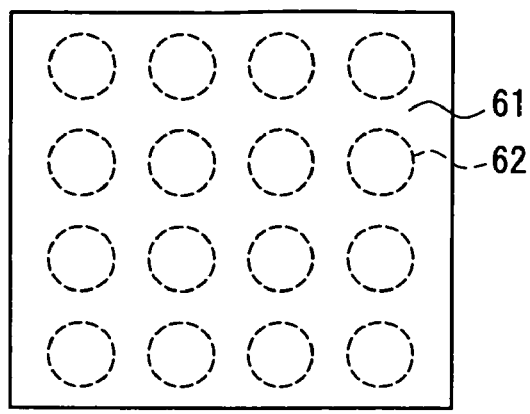
FIGS. 6A-6C are plan schematic views showing a spread of a solution discharged on a substrate.
Figure 6B:
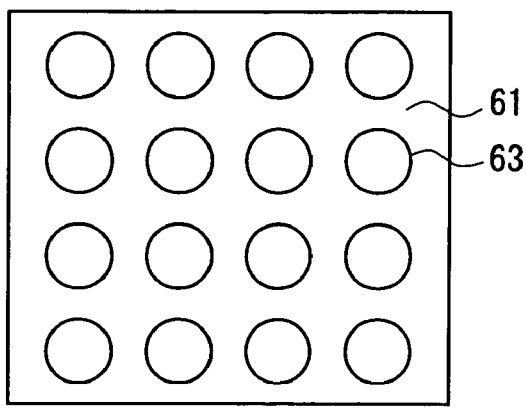
Figure 6C:
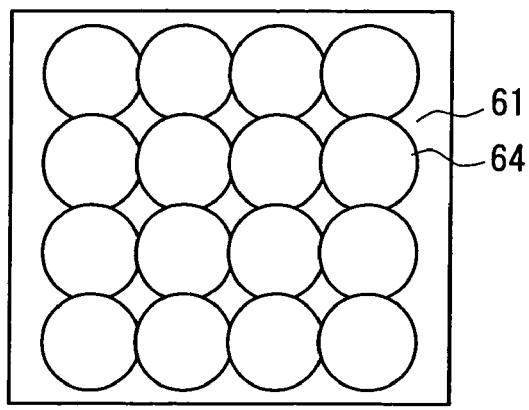

For the ink jet discharging apparatus, a commercially available product such as an ink jet printer can be used, for example. An example of the ink jet printer will be described below with reference to FIG. 3. FIG. 3 is a schematic view of an entire ink jet printer. An ink jet printer 31 in FIG. 3 includes an ink jet head 32 that prints by using a piezoelectric effect from a piezoelectric element, and it applies ink drops discharged from this ink jet head 32, onto a recording medium 33 such as paper in order to record. The ink jet head 32 is mounted on a carriage 35 arranged in the main scanning direction X, and the ink jet head 32 reciprocates in the main scanning direction X in accordance with the carriage 35 reciprocating along the carriage shaft 34. Furthermore, the ink jet printer 31 includes a plurality of rollers (transportations) 36 for moving the recording medium 33 relatively in a sub-scanning direction Y perpendicular to the width direction (X direction) of the ink jet head 32. The ink jet head 32 includes, for example, a nozzle plate with a nozzle hole for discharging ink, a drive section for discharging ink from the nozzle, and a section for feeding ink to the nozzle. An example of the ink jet head will be explained below with reference to FIGS. 4A and 4B. FIGS. 4A and 4B are schematic views showing the ink jet head, and the same reference numerals in these figures are assigned to the same elements. FIG. 4A is a cross-sectional view showing a nozzle hole 46 of the ink jet head and the surrounding parts, where the nozzle hole 46 is in communication with a pressure chamber 43, and a diaphragm 42 and a piezoelectric element 41 are formed in this order above the pressure chamber 43. The pressure chamber 43 is filled with ink, which is fed from an ink flow channel 45 through an ink-feeding hole 44. When a voltage is applied to the piezoelectric element 41, the piezoelectric element 41 and the diaphragm 42 flex, increasing the pressure in the pressure chamber 43, so that the ink is discharged from the nozzle hole 46. Preferably, the surface of a nozzle hole 46 is treated to have water-repellency so that the ink is discharged from the nozzle hole 46 in a constant direction. FIG. 4B is a schematic three-dimensional perspective view taken along an alternate long and short dashed line 40 in FIG. 4A. Although only the structure near about two nozzle holes 46 is shown in FIG. 4B, the number of the nozzle structures is not limited particularly, and more than two nozzle structures can be provided. FIG. 4B shows that the piezoelectric element 47 and the diaphragm 42 on the left side flex so that an ink 48 is discharged from the nozzle hole 46 in the direction of an arrow 49. By using this ink jet head and by replacing the ink to the probe solution, the probe solution can be placed on the substrate.

(Probe Fixation)

In the final stage, probes in the probe solution placed on the substrate are fixed onto the substrate so as to manufacture a biochip. For example, in a case of using physical bonding for probe fixation, the probes can be fixed by only drying the solvent of the probe solution. The drying method can be selected from, for example, a cool-dry at room temperature, blowing with a dry gas, and drying in an oven at temperature of 40 to 80° C. Similarly, in a case of bonding the probes through a chemical bond, any suitable methods can be selected.

Specifically for example, a chemical reaction occurs between any one of $NH_2$, COOH, OH, $SO_3H$ or SH present in the probe molecules and any one of $NH_2$, COOH, OH, or SiOH present on the substrate surface, thereby forming a covalent bond. If the probes do not have any suitable functional groups to be bonded covalently to the substrate, the probes may be chemically modified previously with functional groups. For example, when both the probes and the substrate have $NH_2$, previously the substrate is dipped in an aqueous solution of 1-3 wt % glutaraldehyde, washed with water and dried, and then the probe solution is dripped on the substrate, so that the probes are fixed to the substrate by a covalent bond. When both the probes and the substrate have COOH, the substrate is dipped in an aqueous solution containing 1-5 wt % of 1-(3-dimethylaminopropyl)-3-ethylcarbodiimide dissolved, washed with water and dried, and then the probe solution is dripped on the substrate, so that the probes are fixed to the substrate by a covalent bond. Alternatively, when the substrate is made of gold, copper, silver or the like which has a tendency to bond with molecules having SH groups or SS groups, the probe molecules may be chemically modified with SH groups or SS groups previously.

A biochip thus manufactured in a process according to the present invention has a monomolecular film 25 as shown in FIGS. 2C-2E or the like, and the monomolecular film made of molecules having hydrophobic chains and functional groups to be adsorbed onto the substrate is formed on regions to fix the probes. It will be difficult to that organic contaminants adhere to the regions, and even when adhering, the contaminants can be removed easily. Therefore, the biochip is resistant to contamination in comparison with a conventional biochip.

As mentioned above, when the contents of the molecules having hydrophobic chains and functional groups to be adhered to a substrate and probes in the probe solution exceed the amount required for forming the monomolecular film or for fixing the probes, the molecules and probes will be accumulated on the monomolecular film on the substrate (see FIG. 2D, for example). The molecules accumulated on the monomolecular film may cover the probes fixed to the substrate surface and it may degrade the detectability of the biochip. In such a case, it is preferable to wash the substrate with a liquid after fixing the probes.

As a result of the washing, both the molecules and probes adsorbed onto the monomolecular film can be removed (see FIG. 2E, for example); The favorable effect, namely, resistance to contamination, will not be lost even after the washing, since the probe regions of a biochip manufactured according to the present invention are provided with a monomolecular film of molecules having the hydrophobic chains and the functional groups to be adsorbed onto a substrate.

The liquid used for the washing is not limited particularly as long as it does not degrade the biochip, and the examples include pure water, buffer solutions or the like. An aqueous solution containing a small amount of alcohol is preferred particularly, since it easily dissolves molecules having hydrophobic chains and functional groups to be adsorbed onto a substrate, e.g., molecules having fluoroalkyl chains. When a mixed solution of water and alcohol is used for the washing liquid, the concentration of the alcohol is 1 to 80 wt % for example, preferably 10 to 70 wt %, and more preferably, 30 to 50 wt %.

Next, a probe solution of the present invention will be described. A probe solution of the present invention is a probe solution for a biochip, and the probe solution contains molecules having hydrophobic chains and polar groups together with probes. The probe solution of the present invention can be used for manufacturing the above-mentioned biochip of the present invention.

For the probe solution of the present invention, there is no particular limitation on polar groups in molecules having hydrophobic chains and the polar groups. However, in a use of manufacturing a biochip for example, preferably the polar groups are functional groups that can be adsorbed onto the substrate of the biochip. Embodiments regarding the molecules having hydrophobic chains and polar groups and the probes in the probe solution of the present invention are as mentioned above.

Next, a biochip of the present invention will be described. The biochip of the present invention has a substrate, a monomolecular film including molecules that have hydrophobic chains and functional groups to be adsorbed onto the substrate and being formed on a plurality of regions isolated from each other on the substrate, and probes fixed onto the substrate in the regions on which the monomolecular film is formed. An example of the hydrophobic chain of the molecule is a hydrocarbon chain, preferably a haloalkyl chain formed by substituting at least one hydrogen atom of a hydrocarbon chain with a halogen atom, and more preferably, a fluoroalkyl chain. For the probes, for example, a nucleic acid, a protein, a sugar, a cell, and a modified substance thereof can be used. It is preferable for the biochip of the present invention that the probe regions on the substrate surface are water-repellent while the other regions on the substrate surface are hydrophilic. The biochip of the present invention can be manufactured by the above-mentioned process for manufacturing a biochip of the present invention and/or by using the probe solution of the present invention.

By using the process of the present invention, the biochip of the present invention can be made easily as a biochip having probe regions arranged at a high density, and the biochip is inexpensive. Furthermore, the biochip of the present invention is resistant to contamination, and it reacts with a sample solution efficiently with good reproducibility. Therefore, regarding the biochip of the present invention, the operability in storage and handling, the sensitivity and accuracy in measurement will be improved. As a result, studies and diagnosis of genes with use of DNA chips can be performed in a simpler and easier manner. The biochip of the present invention can be used, for example, for a genetic screening to examine a individual gene expression, and it is expected to clarify individual genetics. As a result, medical cures suitable for individuals, and early diagnosis and treatment of cancers will be possible.

Examples of the present invention will be described below.

EXAMPLE 1

Preparation of Substrate

A borosilicate glass substrate 10 mm×10 mm in size and 1 mm in thickness was subjected to ultrasonic cleaning in a surfactant, and then washed in running pure water. After the moisture on the substrate was blown off with nitrogen, the substrate was subjected to ultraviolet irradiation in an ozone atmosphere at 110° C. so as to remove organic contaminants residing on the substrate surface.

Preparation of Molecules having Fluoroalkyl Chains

For molecules having fluoroalkyl chains, molecules as disclosed in U.S. Pat. No. 5,550,184 were used. Specifically, the molecules were prepared in the following manner.

200 ml of heptane and 20 ml of $CF_3(CF_2)_7C_2H_4SiCl_3$ were introduced into a round bottom flask of 500 ml and mixed. This operation was conducted in a glove box filled with a dry nitrogen gas. The round bottom flask is provided with a gas inlet and a gas outlet. Next, the dry nitrogen gas was introduced into the round bottom flask from the gas inlet in order to maintain the interior of the flask under a dry atmosphere, and 20 ml of $CH_3OC_2H_4OC_2H_4OH$ was dripped little by little, while stirring the solution in the flask with an agitator. After the dripping was completed, the stirring was continued for 12 hours while the flask was warmed with a 80° C. oil bath for reflux. Later, the heptane in the flask was evaporated and removed by using a vacuum evaporator. As a result, $CF_3(CF_2)_7C_2H_4Si(OC_2H_4OC_2H_4CH_3)_3$ with a purity of substantially 100% was obtained.

Next, while stirring an aqueous solution of 2.4 wt % n-hexadecyltrimethylammonium chloride, the thus synthesized $CF_3(CF_2)_7C_2H_4Si(OC_2H_4OC_2H_4CH_3)_3$ was dissolved in the solution so as to obtain a concentration of 8 wt %. After stirring for about 30 minutes, the solution was kept for 24 hours without stirring. As a result, an aqueous solution (hereinafter referred to as a water-repellent liquid A) was obtained, in which $CF_3(CF_2)_7C_2H_4Si(OC_2H_4OC_2H_4CH_3)_3$ and a hydrolysate thereof were dissolved. The n-hexadecyltrimethylammonium chloride serves to accelerate dissolution of the $CF_3(CF_2)_7C_2H_4Si(OC_2H_4OC_2H_4CH_3)_3$ and a hydrolysate thereof into water.

DNA Probe

Single-stranded oligonucleotide (manufactured by Wako Pure Chemical Industries, Ltd.) formed of 10 bases including the sequence below (SEQ ID NO 1) was used for a DNA probe.

ATTCAGACTG          (SEQ ID NO 1)

Preparation of Probe Solution

For a probe solution, an aqueous solution was prepared by dissolving 20 wt % of the DNA probe and 0.5 wt % of the water-repellent liquid A.

Production of DNA Chip

The probe solution was filled in an ink jet device and discharged as droplets, each being 4 pl (about 20 µm in diameter) in a matrix at a spacing of 500 µm on a substrate and placed. Placement of the droplets was controlled by a computer so that the solution was discharged on predetermined positions, by moving the substrate while the ink jet device was kept still. After discharging the probe solution, the substrate was kept for about 1 hour for drying. The ink jet device used here includes an ink jet head as shown schematically in FIGS. 4A and 4B, and the ink jet head had 100 nozzle holes in a line at spacing of 500 µm. Each nozzle hole was 20 µm in diameter. The ink jet head had a diaphragm of copper 3 µm in thickness and a piezoelectric element of lead zirconate titanate (PZT) 3 µm in thickness. The PZT was formed by a vacuum sputtering and aligned in the vertical direction (001) of the film. The probe solution was discharged by applying to the piezoelectric element a voltage having a frequency of 10 kHz and an amplitude of 20 V.

Hybridization Reaction and Evaluation

In a 1M NaCl/50 mM phosphate buffer solution (pH=7.0), a target formed by bonding rhodamine to a 5' end of single-stranded oligonucleotide with the base sequence complementary to the DNA probe was dissolved, so that the final concentration was 1 µM. DNA chips were dipped in this solution for 3 hours, and then the DNA chips were washed with the 1M NaCl/50 mM phosphate buffer solution (pH=7.0) so as to remove target oligonucleotide that did not participate in the hybridization reaction. In the dipping of the DNA chips in the solution, each DNA chip substrate was picked with tweezers at the end and dipped slowly in the solution.

The hybridization reaction was carried out in two manners. In one method, the thus manufactured DNA chips were used directly. In the alternative method, the thus manufactured DNA chips were left for 2 days and washed with pure water as a pretreatment before the hybridization reaction.

Fluorescence quantities of the targets on the DNA chips were measured using an image processing device (trade name: ARGUS50 manufactured by Hamamatsu Photonics). Specifically, the DNA chips after the hybridization reaction were set in an inverted fluorescent microscope, fluorescence emitted from the regions where the DNA probes were placed was captured into a CCD camera of the microscope and evaluated with use of the image processing device. Here, since the fluorescence is derived from the rhodamine, it was confirmed that the DNA probes and the targets were bonded to each other in the regions where the DNA probes were placed.

Evaluations of the thus manufactured DNA chips were performed, for the two items of (1) regions emitting fluorescence and (2) fluorescence intensity, by sampling randomly 200 regions on the substrate on which the DNA probes were placed, and calculating the average values of the regions for the above (1) and (2). The results show that for the item (1), the fluorescent regions are present within a perfect circle of about 40 μm irrespective of the pretreatment before the hybridization, and all the fluorescent regions on the substrate were separated from each other by 500 μm and isolated spatially. For the item (2), the fluorescence intensity of a DNA chip subjected to the pretreatment before the hybridization was 80% of that of a DNA chip without being subjected to the pretreatment. The reason is considered to be that the stains residing on the DNA chips after being kept for 2 days inhibited the hybridization reaction of the targets.

COMPARATIVE EXAMPLE 1

DNA chips were manufactured and evaluated in the same manner as in Example 1 except that the water-repellent liquid A was not used for the probe solution. The results are shown in Table 1 below, together with the results of Example 1.

TABLE 1

|  | Fluorescent region | Fluorescence intensity (relative value) |
| --- | --- | --- |
| Example 1 | Present within a perfect circle 40 μm in diameter, isolated spatially from each other by 500 μm | 100 (without p.b.h.*) 80 (with p.b.h.) |
| Com. Ex. 1 | Indeterminate shape, present within a circle 300 to 600 μm in diameter; the shape and size vary depending on positions | 150 (without p.b.h.) 50 (with p.b.h.) |

*p.b.h.: pretreatment before hybridization

As indicated in the above Table 1, the fluorescent regions of the DNA chips in Comparative Example 1 were larger than the fluorescent regions in Example 1, and the shapes and sizes varied. Moreover, most of the fluorescent regions in Comparative Example 1 were not isolated from each other spatially, and they overlap. In other words, although the probe solution was discharged on the substrate at spacing of 500 μm as mentioned above, the respective fluorescent regions overlapped. The reason is considered to be that the probe solutions on the respective regions spread on the substrate and the respective probe solutions got contacted to each other.

When the DNA chips were subjected to the pretreatment of leaving for 2 days before the hybridization, the fluorescence intensity of the DNA chip in Comparative Example 1 became ⅓ of the DNA chip not subjected to the pretreatment. The reduction in the fluorescence intensity due to the pretreatment was larger for the DNA chip in Comparative Example 1 than for the DNA chip in Example 1 (see Table 1 above). This shows that the DNA chips in Example 1 are resistant to contamination in comparison with the DNA chips in Comparative Example 1.

In the cases where the pretreatment before the hybridization was omitted, the fluorescence intensity of the DNA chip in Example 1 was smaller than that of the DNA chip in Comparative Example 1 (see Table 1 above). The reason is considered to be that the DNA probe density in the DNA probe placement regions of the substrate was lowered under the influence of molecules having fluoroalkyl chains in the water-repellent liquid A contained in the DNA probe solution in Example 1 (see Table 2, for example). Nevertheless, the DNA chip in Example 1 had a sufficient fluorescence intensity.

EXAMPLE 2

DNA chips were manufactured and evaluated in the same manner as in Example 1 except that the DNA chip substrates of the thus manufactured DNA chips were washed with a mixed solution of pure water and ethanol (volume ratio: 8 to 2).

The results show that, similarly to the DNA chips in Example 1, the DNA chips in Example 2 were preferable since the probe solution did not spread or bleed on the substrate and the DNA probes were fixed, and the DNA chips were resistant to contamination. Furthermore, the fluorescence intensities of the DNA chips in Example 2 were greater by about 10% than those of the DNA chips in Example 1 irrespective of the pretreatment before the hybridization. The reason is considered to be that the molecules having fluoroalkyl chains adsorbed onto the monomolecular film were removed by the washing with the mixed solution of pure water and ethanol, and thus the hybridization between the targets and the DNA probes became easier.

EXAMPLE 3

DNA chips were manufactured and evaluated in the same manner as in Example 1 except that the probe solution was prepared by dissolving 0.3 ml of $CF_3(CF_2)_5C_2H_4Si(OCH_3)_3$ in 100 ml of a mixed solution of ethanol and pure water (volume ratio: 7 to 3), the pH being adjusted to 5.0 with a use of HCl, and dissolving the DNA probes in order to make a 20 wt % solution.

The results show that, similarly to the DNA chips in Example 1, the DNA chips in Example 3 were preferable since the probe solution did not spread or bleed on the substrate and the DNA probes were fixed, and the DNA chips were resistant to contamination.

EXAMPLE 4

DNA chips were manufactured and evaluated in the same manner as in Example 1 except that the probe solution was prepared by dissolving 0.3 ml of $CF_3(CF_2)_5C_2H_4Si(OCH_3)_3$ in 100 ml of a mixed solution of ethanol and pure water (volume ratio: 7 to 3), the pH being adjusted to 9.0 with a use of NaOH, and dissolving the DNA probes in order to make a 20 wt % solution.

The results show that, similarly to the DNA chips in Example 1, the DNA chips in Example 4 were preferable since the probe solutions did not spread or bleed on the substrates and the DNA probes were fixed, and the DNA chips were resistant to contamination.

EXAMPLE 5

DNA chips were manufactured and evaluated in the same manner as in Example 1. However in Example 5, the process of dipping the substrates in the solution for the hybridization reaction was varied to examine the influence. Namely, the substrates were introduced into the solution at a predetermined speed (0.1 mm/s to 10 mm/s) by using a dipping device so that the facial orientations of DNA chip substrates were perpendicular to the surface of the sample solution. The substrates were kept in a state entirely dipped in the solution for 3 hours so as to carry out a hybridization reaction between the DNA probes on the biochips and the target molecules in the sample solution. Subsequently, the substrates were taken out from the liquid at a speed of 10 mm/s and washed. Evaluations for the DNA chips were conducted, similarly to Example 1, regarding the two items of (1) regions emitting fluorescence and (2) fluorescence intensity. The results are indicated in Table 2 below together with the results in the following Comparative Example 2.

COMPARATIVE EXAMPLE 2

In Comparative Example 2, evaluations were conducted in the same manner as in Example 5 except that the DNA chips in Example 5 were replaced by DNA chips being water-repellent except for the regions to which the DNA probes were fixed. The DNA chips were manufactured by a conventionally-proposed process for preventing bleeding at the time of dripping a DNA probe solution by an ink jet method. The process for manufacturing each of the DNA chips will be specified below.

On a soda glass substrate washed by the same process as in Example 1, circular positive resist patterns 40 μm in diameter were arrayed in a matrix at a spacing of 500 μm by photolithography. Next, the substrate was dipped for 1 hour in a mixed solution of n-hexadecane and chloroform (volume ratio: 4 to 1) in which 1 vol % of $CF_3(CF_2)_7C_2H_4Cl_3$ was dissolved. This operation was conducted in a glove box under an atmosphere of a dry nitrogen gas. As a result of this operation, the $CF_3(CF_2)_7C_2H_4Cl_3$ was chemically bonded onto the substrate where no resist was formed, and thus a monomolecular film was formed. Subsequently, the substrate was washed with acetone so as to peel the resist off. As a result, hydrophilic circular regions 40 μm in diameter and arrayed in matrix at spacing of 500 μm and also water-repellent regions surrounding the circular regions were formed on the substrate. Next, as in Example 1, the DNA probe solution was placed on the hydrophilic regions. In the placement, the positions of the substrate and the ink jet head were adjusted previously so that the solution would be dripped only on the hydrophilic regions, and the solution was discharged by use of a computer to correspond to the change in relative positions of the substrate and the head. Later, the substrate was kept to dry at room temperature for about 1 hour.

The results in Example 5 and Comparative Example 2 are shown in Table 2 below.

TABLE 2

| | Dipping speed (mm/s) | Fluorescent region | Fluorescence intensity (relative intensity) |
|---|---|---|---|
| Example 5 | 0.1 | Present within circles 40 μm in diameter and isolated spatially from each other at spacing of 500 μm; fluorescence intensity is unchanged depending on circles | 100 |
| | 0.5 | Present within circles 40 μm in diameter and isolated spatially from each other at spacing of 500 μm; fluorescence intensity is unchanged depending on circles | 100 |
| | 2 | Present within circles 40 μm in diameter and isolated spatially from each other at spacing of 500 μm; fluorescence intensity is unchanged depending on circles | 100 |
| | 5 | Present within circles 40 μm in diameter and isolated spatially from each other at spacing of 500 μm; fluorescence intensity is unchanged depending on circles | 100 |
| | 10 | Present within circles 40 μm in diameter and isolated spatially from each other at spacing of 500 μm; fluorescence intensity is unchanged depending on circles | 100 |
| Comparative Example 2 | 0.1 | Present within circles 40 μm in diameter and isolated spatially from each other at spacing of 500 μm; fluorescence intensity is unchanged depending on circles | 150 |
| | 0.5 | Present within circles 40 μm in diameter and isolated spatially from each other at spacing of 500 μm; fluorescence intensity is unchanged depending on circles | 150 |
| | 2 | Present within circles 40 μm in diameter and isolated spatially from each other at spacing of 500 μm; circles with low fluorescence intensity being dispersed | 100 |
| | 5 | Present within circles 40 μm in diameter and isolated spatially from each other at spacing of 500 μm; circles with low fluorescence intensity being dispersed | 70 |
| | 10 | Present within circles 40 μm in diameter and isolated spatially from each other at spacing of 500 μm; regions with high fluorescence intensity and circlar regions with low fluorescence intensity being dispersed unevenly | 50 |

As shown in Table 2 above, in Example 5, the regions emitting fluorescence were present within circles 40 μm in diameter for all of the dipping speeds (0.1 mm/s to 10 mm/s), and the respective regions were isolated spatially from each other at spacing of 500 μm. The intensity values of fluorescence emitted from the respective circular regions were the same. Furthermore, the average fluorescence intensity was constant irrespective of the dipping speed.

Similarly in Comparative Example 2, the regions emitting fluorescence were present within circles 40 μm in diameter, and the respective regions were isolated spatially from each other at spacing of 500 μm. The reason is considered to be that since the regions other than the regions for forming the probes are water-repellent, a dripped probe solution will not either spread or bleed into the water-repellent regions. When the dipping speed was 0.5 mm/s or less, the intensity values of fluorescence emitted from the respective circular regions were the same. The average fluorescence intensity was constant irrespective of the dipping speed. The average fluorescence intensity was greater than that of Example 5. The reason is considered to be that in Comparative Example 2, the probe density was higher than the case of Example 5 since molecules having fluoroalkyl chains were not present within the circular regions, and thus the amount of the target molecules subjected to the hybridization was increased. When the dipping speed was 2 mm/s or higher, the intensity values of the fluorescence emitted from the respective circular regions varied depending on the regions. And the average value of the fluorescence intensity tended to decrease with the increase of the dipping speed. This implies that the amount of the target molecules subjected to the hybridization on the DNA chip was decreased with the increase of the dipping speed.

EXAMPLE 6

Even when the speed of dipping the substrate in the sample solution was increased, the amount of the molecules being subjected to hybridization did not change for the DNA chips in Example 5, although the amount of the molecules being subjected to hybridization was decreased for the DNA chip in Comparative Example 2. For examining the reason, regarding the DNA chips in Example 5 and Comparative Example 2, the surface conditions of the substrates dipped in the solution was observed visually.

In the case of the DNA chips of Example 5, no changes were found for the substrate surfaces before and in a state being dipped in the solution at any dipping speeds. Similarly, no change was found in Comparative Example 2 for the case where the dipping speed was 0.5 mm/s or less. On the other hand, when the dipping speed was 2 mm/s or higher in Comparative Example 2, a large number of air bubbles were adsorbed onto the surface of the substrate dipped in the solution according to an observation. The number and the size of the air bubbles were increased with the increase of the dipping speed. These results can lead to the following conclusion. That is, when the dipping speed is high in Comparative Example 2, a part of the air bubbles adhering to the substrate covers the DNA probes, and thus the hybridization between the probes and the target molecules will be unlikely to occur in the covered regions. As the number and the size of the adhering air bubbles increase with the increase of the dipping speed, the probe regions covered with the air bubbles increase as well, and thus the probe regions not allowing the hybridization increases. As a result, as indicated in Table 2 above, apparently the average fluorescence intensity was decreased in Comparative Example 2 with the increase of the dipping speed. It can be considered also that since the air bubbles will adhere to the substrate sporadically and unevenly, areas where the hybridization reaction can occur and the other areas where the hybridization reaction cannot occur are formed unevenly, so that the fluorescence intensity varies depending on the positions.

As mentioned above, air bubbles will not adhere to the DNA chip substrate surface in Example 5 even when the dipping speed is high, while in Comparative Example 2, air bubbles will adhere when the dipping speed is high. This difference is caused probably by the difference in the percentages of areas of the water-repellent regions in the entire substrates. On a DNA chip substrate, areas of the regions to which the probes are fixed are smaller than the remaining areas. Therefore in Example 5, the most part of the DNA chip substrate is hydrophilic, while in Comparative Example 2, most of the part is water-repellent. Probably therefore, air bubbles adhere more easily in Comparative Example 2 than in Example 5 when dipping the substrates in the sample solution.

As mentioned above, regarding the biochip of the present invention, since the regions where DNA probes are not formed are hydrophilic, air bubbles will be difficult to adhere to the substrate surface at a time of dipping the substrate in a sample solution. As a result, a hybridization reaction with target molecules occurs with good reproducibility, thereby enabling to detect the target molecules with good reproducibility.

INDUSTRIAL APPLICABILITY

As described above, since the manufacturing process of the present invention enables to suppress spreading or bleeding of a probe solution on a substrate and fix DNA probes, a biochip with probe regions arranged at a high density can be manufactured easily. Therefore, for example, an inexpensive biochip can be manufactured. Furthermore, since a biochip manufactured by the process of the present invention is resistant to contamination and reacts with a sample solution efficiently with good reproducibility, the operability in storage, handling or the like, and sensitivity and accuracy in measurement, will be excellent. In other words, the present invention realizes a further widespread use of biochips. Therefore, the present invention is useful in various fields where biochips are used, such as genetic studies, genetic diagnosis, gene therapy, basic medicine, clinical medicine and the like.

Sequence Table Free Text
  SEC ID NO 1 DNA probes for DNA chip

The invention claimed is:

1. A process for manufacturing a biochip, the process comprising steps of:
(a) placing a probe aqueous solution on a substrate;
wherein the probe aqueous solution includes a compound represented by Formula (1) or (2) below or a hydrolysate thereof and a probe:

$$CF_3(CF_2)_8C_2H_4SiR_{3-x}(OY)_x \quad (1)$$

$$CF_3(CF_2)_8C_2H_4Si[(O-CH_2CH_2)_m-OR]_3 \quad (2)$$

where, in the Formula (1), R and Y denote a methyl group, an ethyl group, a propyl group or a butyl group independently, n is a natural number in a range of 1 to 10, x is a natural number in a range of 1 to 3, and when x=1, two Rs exist, the Rs being the same or different from each other, and in the Formula (2), R denotes a methyl group, an ethyl group, a propyl group or a butyl group, n is a natural number in a range of 1 to 10, and m is a natural number in a range of 1 to 10,
wherein the probe has at least one functional group selected from the group consisting of $-NH_2$, $-COOH$, $-SO_3H$ and $-SH$, and
wherein the substrate has at least one functional group selected from the group consisting of $-OH$, $-NH_2$, $-COOH$, $-SO_3H$ and $-CN$ on the surface of the substrate,
(b) fixing the compound represented by Formula (1) or (2) or a hydrolysate of the compound represented by Formula (1) or (2) through a chemical reaction between a $-SiR_{3-x}(OY)_x$ group or a $-Si[(O-CH_2CH_2)_m-OR]_3$ group of the compound represented by Formula (1) or (2), or $-SiOH$ of each hydrolysate of the compound represented by Formula (1) or (2), to the functional group of the substrate;
(c) fixing the probe onto the substrate by chemical bonding or physical adsorption of the functional group of the substrate and the functional group of the probe;
wherein step (b) and step (c) are carried out simultaneously, and
wherein the probe aqueous solution shrinks by repulsion on the substrate due to a functional group $CF_3(CF_2)_n-$ included in a compound represented by Formula (1) or (2) or a hydrolysate thereof, which has been fixed in step (b);
(d) evaporating the probe aqueous solution; and
(e) washing the substrate.

2. The process for manufacturing a biochip according to claim 1, wherein the probe solution is placed on the substrate by dripping or by discharging in an ink jet method.

3. The process for manufacturing a biochip according to claim 1, wherein the probe is derived from at least one selected from the group consisting of a nucleic acid, a protein, a sugar, and a cell.

* * * * *

UNITED STATES PATENT AND TRADEMARK OFFICE
CERTIFICATE OF CORRECTION

PATENT NO. : 7,560,268 B2
APPLICATION NO. : 10/585720
DATED : July 14, 2009
INVENTOR(S) : Nakagawa Page 1 of 1

It is certified that error appears in the above-identified patent and that said Letters Patent is hereby corrected as shown below:

Column 23, Line 9, Formula (1) Claim 1

"$CF_3(CF_2)_8 \ C_2H_4SiR_{3-x}(OY)_x$" should read
--$CF_3(CF_2)_n \ C_2H_4SiR_{3-x}(OY)_x$--

Column 23, Line 10, Formula (2) Claim 1

"$CF_3(CF_2)_8C_2H_4Si[(O-CH_2CH_2)_m-OR]_3$" should read
--$CF_3(CF_2)_nC_2H_4Si[(O-CH_2CH_2)_m-OR]_3$--

Column 23, Line 22 – 23, Claim 1

"consisting of $-NH_2$, $-COOH$, $-SO_3H$, and $-SH$, and" should read
--consisting of $-NH_2$, $-COOH$, $-OH$, $-SO_3H$ and $-SH$, and--

Signed and Sealed this

Sixteenth Day of March, 2010

David J. Kappos
*Director of the United States Patent and Trademark Office*

SEQUENCE LISTING

<160> NUMBER OF SEQ ID NOS: 1

<210> SEQ ID NO 1
<211> LENGTH: 10
<212> TYPE: DNA
<213> ORGANISM: Artificial
<220> FEATURE:
<223> OTHER INFORMATION: DNA probe for DNAchip

<400> SEQUENCE: 1
attcagactg                                                          10